(12) United States Patent
Carr et al.

(10) Patent No.: US 11,629,605 B2
(45) Date of Patent: Apr. 18, 2023

(54) TURBINE WHEEL AND METHOD OF MANUFACTURING THE SAME

(71) Applicant: Cummins Ltd, London (GB)

(72) Inventors: Henry Carr, Huddersfield (GB); Paul Ghosh, Huddersfield (GB)

(73) Assignee: Cummins LTD, London (GB)

( * ) Notice: Subject to any disclaimer, the term of this patent is extended or adjusted under 35 U.S.C. 154(b) by 0 days.

(21) Appl. No.: 17/042,618

(22) PCT Filed: Mar. 28, 2019

(86) PCT No.: PCT/GB2019/050891
§ 371 (c)(1),
(2) Date: Sep. 28, 2020

(87) PCT Pub. No.: WO2019/186170
PCT Pub. Date: Oct. 3, 2019

(65) Prior Publication Data
US 2021/0025281 A1    Jan. 28, 2021

(30) Foreign Application Priority Data

Mar. 28, 2018   (GB) .................................... 1805007

(51) Int. Cl.
*F01D 1/02* (2006.01)
*F01D 5/34* (2006.01)
(Continued)

(52) U.S. Cl.
CPC .............. *F01D 5/34* (2013.01); *F01D 5/225* (2013.01); *F01N 5/04* (2013.01); *F01N 2290/04* (2013.01);
(Continued)

(58) Field of Classification Search
CPC ... F01D 5/35; F01D 5/225; F01D 1/02; F01D 1/026; F01D 5/34; F01D 9/042;
(Continued)

(56) References Cited

U.S. PATENT DOCUMENTS 2,739,782 A * 3/1956 White ..................... F01D 9/045
                                                          415/17
4,507,047 A    3/1985 Coons
(Continued)

FOREIGN PATENT DOCUMENTS

DE    202012009739 U1    11/2012
EP        3000556 A1     3/2016
(Continued)

OTHER PUBLICATIONS

International Preliminary Report on Patentability received for PCT Patent Application No. PCT/GB2019/050891, dated Oct. 8, 2020, 9 pages.
(Continued)

*Primary Examiner* — Eldon T Brockman
*Assistant Examiner* — Maxime M Adjagbe
(74) *Attorney, Agent, or Firm* — Faegre Drinker Biddle & Reath LLP (57) ABSTRACT

A turbine wheel consists of a first shroud component and a second bladed disc component. The shroud component comprises a shroud structure, a hub structure and a spoke formed integrally therewith and extending between the shroud structure and the hub structure. The bladed disc component comprises a hub member having inner and outer rims, turbine blades disposed on the outer rim, and at least one receiving zone for receiving the spoke, said at least one receiving zone extending radially between the inner and outer rims. The shroud component and the bladed disc component are connected and thus provide the turbine wheel (Continued)

with a shrouded portion. A shrouded turbine wheel can therefore be conveniently assembled starting from at least two components. Further, these components have simplified geometries for easy manufacture, for example using a casting technique, while the overall mechanical performance of the turbine is preserved or improved.

19 Claims, 3 Drawing Sheets

(51) Int. Cl.
  *F01D 5/22* (2006.01)
  *F01N 5/04* (2006.01)
(52) U.S. Cl.
  CPC ...... *F05D 2220/40* (2013.01); *F05D 2230/22* (2013.01); *F05D 2230/237* (2013.01); *F05D 2230/238* (2013.01); *F05D 2260/37* (2013.01)
(58) Field of Classification Search
  CPC ............. F05D 2220/40; F05D 2220/60; F05D 2220/62; F05D 2220/326; F05D 2220/327
  See application file for complete search history.

(56) References Cited

U.S. PATENT DOCUMENTS

| | | | |
|---|---|---|---|
| 5,178,517 A | | 1/1993 | Reinhorn et al. |
| 2009/0277192 A1* | | 11/2009 | Williams ................ F25B 9/002 |
| | | | 62/401 |
| 2014/0321968 A1* | | 10/2014 | Kreitmair-Steck ..... B64C 27/82 |
| | | | 415/1 |
| 2017/0151608 A1* | | 6/2017 | Isogai ................... F04D 29/023 |
| 2018/0038239 A1* | | 2/2018 | Stafford ................ F01D 17/167 |

FOREIGN PATENT DOCUMENTS

| | | |
|---|---|---|
| EP | 3075967 A1 | 10/2016 |
| JP | S63129103 A | 6/1988 |

OTHER PUBLICATIONS

International Search Report and Written Opinion issued by the European Patent Office, dated Jul. 10, 2019, for International Application No. PCT/GB2019/050891; 12 pages.

* cited by examiner

TURBINE WHEEL AND METHOD OF MANUFACTURING THE SAME

CROSS-REFERENCE TO RELATED APPLICATIONS

This application is a national phase filing of International Application No. PCT/GB2019/050891, titled TURBINE WHEEL AND METHOD OF MANUFACTURING THE SAME, filed Mar. 28, 2019, which claims priority to United Kingdom Application No. 1805007.0, filed Mar. 28, 2018, the disclosures of which being expressly incorporated herein by reference.

TECHNICAL FIELD

The present disclosure relates to turbine wheels, and particularly to shrouded turbine wheels. In particular, the present disclosure relates to axial shrouded turbine wheels for waste heat recovery applications such as the recovery of heat which would otherwise be wasted from exhaust gases generated by internal combustion engines of the type that power heavy vehicles. The present disclosure also relates to methods of manufacturing and/or assembling said turbine wheels.

BACKGROUND

Turbine wheels, and particularly shrouded turbine wheels, are known to have a complex geometry and there is therefore a general need to develop designs and methods that make their manufacturing easier and more cost effective while preserving mechanical performance.

In the case of shrouded turbine wheels it is known, amongst other techniques, to form integrally the shroud as part of the turbine wheel as a single piece. However, in the case of small and compact wheels such as those of axial turbines of the type used in waste heat recovery systems for heavy vehicles such as trucks and the like, the vanes are tightly packed and highly curved and, therefore, the shroud is provided as a separate ring.

Shroud rings can be connected to their respective bladed discs to form axial shrouded turbine wheels using thermal expansion and/or shrinkage, press fitting, welding or other manners of joining known in the art. Welding or brazing on or around the crescent-shaped tip sections of the blades at the interface with the shroud ring is particularly problematic. Under certain conditions, these shroud rings may 'peel off' the bladed discs. This means that the joints between the shroud rings and the blades, and thus the corresponding joining methods employed, may be unsatisfactory.

One possibility for dealing with the above issue may be to impose limits on the turbine geometry and/or size that can be achieved with a specified manufacturing technique. However, this may be an unduly restrictive approach. Further, it only minimises rather than eliminates the risk of imperfect joints. As such, imperfect joints may still be the cause of critical stress concentrations between a shroud ring and the blades of a respective shroud supporting disc. These turbine wheels may therefore still be susceptible to failure, for example from fatigue, or their service life may be reduced.

The present disclosure aims to solve or mitigate at least one of the problems concerned with the prior art.

SUMMARY OF DISCLOSURE

According to an aspect of the present disclosure, there is provided a turbine wheel comprising a shroud component and a bladed disc component. The shroud and bladed disc components are one received or receivable by the other. The shroud component comprises a shroud structure, a hub structure and at least one spoke extending radially between the shroud structure and the hub structure. The bladed disc component comprises a hub member defining an outer rim, and one or more turbine blades disposed on the outer rim. The turbine wheel will thus have at least a shrouded portion provided by the shroud structure of the shroud component.

The shroud component and the bladed disc component may be connected, or can be connected, for example if the turbine wheel is supplied as a kit of parts for assembly, to provide at least part of the shrouded turbine wheel. It is the complete shrouded turbine wheel that can then be utilised for its intended purpose.

The shroud and bladed disc components may comprise respective mating surfaces. Accordingly, there may be one or more surfaces of the one and the other of these components that mate or abut each other when the shroud and bladed disc components are received one in the other.

Designing the shroud of the turbine wheel as part of the shroud component described herein is advantageous in that the shroud of the complete turbine wheel is supported by the at least one spoke and, ultimately, by the hub structure of the shroud component to which the spoke is connected. Some of the stresses acting, in use, on the shroud are therefore borne by the spoke and the hub of the turbine wheel. This limits or eliminates undesirable stress concentrations between the bladed disc and the shroud in the complete turbine wheel and may prevent—for given operating conditions, on a wheel of specified dimension—the occurrence of the phenomenon of peel-off.

In preferred turbine wheels, the turbine wheel consists of said shroud and bladed disc components, that is to say the shrouded turbine wheel is formed by assembling two and only two components, these being the shroud component and the bladed disc component.

Other turbine wheels may comprise more than two components. For example, at least in principle, there may be a single bladed disc with two or more shroud components fitted thereto to form at least a portion of the complete shrouded turbine wheel.

Alternatively, it would at least in principle be possible to provide a single shroud component with two or more bladed disc components fitted thereto to form at least a portion of the complete shrouded turbine wheel. However, these turbine wheels are less preferred and the inventors have recognised the advantage of providing a complete turbine wheel by assembling two and only two parts.

In preferred turbine wheels the hub structure comprises a hub ring, or is in the form of a hub ring, from which the one or more spokes depart radially.

As it will be appreciated, typically, there will be a plurality of spokes provided. A single spoke, however, is also possible. For example 2, 3, 4, 5, 6, 7, or 8 spokes can be provided, and each of these configurations represents a non-limiting example. The spokes can be provided at equal or irregular angular intervals.

In preferred turbine wheels, the hub member defines an inner rim. Said inner rim can advantageously be circumferential so as to accept the hub ring of the shroud component which can then be made to mate with the inner rim of the bladed disc component. Thus the inner rim can delimit a circular opening provided in the hub member of the bladed disc component. The hub structure or ring can accordingly also be circumferential, at least externally.

The hub structure or hub ring can have its own inner rim shaped according to the shape of a seat on a turbine wheel shaft.

The hub structure and/or hub ring can be adapted to mate with the preferably circular opening on the hub member in male-female fashion.

It is preferred to couple the hub structure as the male part to the circular opening in the hub member as the female part, but opposite arrangements are possible whereby the male part could instead be formed on the hub member.

The complete turbine wheel may preferably have a central circular opening such that the turbine wheel can be accommodated on a round shaft, in use.

The shroud structure may comprise, or be in the form of, a (spoked) shroud ring.

The shroud ring can be angularly disposed around at least part of the turbine wheel. However, in preferred turbine blades, the shroud ring may angularly extend around the entire turbine wheel so as to maximise the benefit of having a turbine wheel with a shroud supported by the spoke(s) and, therefore, by the hub structure of the shroud component.

It is also preferred to provide the shroud component and/or the bladed disc component as monoliths, or, in other words, each as a single, uninterrupted piece, having a bulk volume that does not present discontinuities such as interfaces, joints or the like.

At least one of the spokes, or more preferably each spoke, may comprise a shoulder or projection by which the shroud component and the bladed disc component are one receivable or engageable one with the other. A preferred arrangement is to engage or mate such shoulders or projections on a surface of the hub member of the bladed disc component.

Preferably, each shoulder or projection is configured to engage or mate with the hub member on or about its outer rim.

It is further preferred to form on the hub member one or more dedicated recesses for receiving said one or more shoulders or projections.

These shoulders or projections on the shroud component and recesses on the hub member may be configured so as to be complementary in that, when the shoulders are engaged with their corresponding recesses, the outer rim of the compounded hub of the finished turbine wheel may be precisely cylindrical, thus exactly matching the precise cylindrical shape of an outer rim according to a bladed disc of the prior art, which would be ready to receive a shroud ring which needs to be joined thereto as known in the prior art.

Such a precise complementarity is, however, just a preferred feature and it is appreciated that other, although perhaps less preferred, configurations are possible whereby any such shoulders or projections, when engaged in any recesses or other mating features provided on the bladed disc component, may not together define such a precisely cylindrical shape of the outer rim of the hub member of the turbine wheel. For example, the complete turbine wheel may define only a generally cylindrical outer rim of the bladed disc component. In the complete turbine wheel, this part is also referred to as the 'inner shroud section'.

Alternatively, the bladed disc component may already have a precisely cylindrical shape from which all the required blades project outwardly. Accordingly, the bladed disc may only receive the shroud structure and the hub structure of the shroud component. In possible arrangements, the spokes and/or any shoulders or projections thereof may not be received by the hub member. Instead, they may be located in close proximity to the hub member, but apart therefrom.

At least one of the spokes, or more preferably each spoke, may comprise a respective blade-form element located adjacent the shroud structure.

The blade-form element(s) may be provided on the shroud component so as to complement the blade(s) of the bladed disc component, thereby providing a complete set of blades around turbine wheel.

In alternative arrangements, one spoke may comprise two or more such blade-form elements. It will be understood that these arrangements may necessitate angularly wider spokes than arrangements with a single blade-form element per spoke. In preferred turbine wheels, however, each spoke includes one and only one blade-form element.

The blade-form element(s) may depend from the shroud structure, preferably radially inwardly, so that in use it occupies the position that a blade would have occupied in a conventional bladed disc or 'blisc'.

If the shroud structure is in the form of a shroud ring, or if it comprises a shroud ring, any blade-form elements may depend from the shroud ring, preferably radially inwardly. Thus in preferred turbine wheels the one or more blade-form elements provided on each spoke may extend radially between the corresponding shoulder or projection and the shroud structure.

Preferably, each blade-form element extends radially from the shoulder to the shroud structure, that is the blade-form element extends radially from the shoulder to the shroud structure without any interposed elements located between the shoulder and the blade-form element and/or between the blade-form element and the shroud structure. Providing any such interposed elements would however at least in principle be possible, although this may bring forward less preferred arrangements of turbine wheels.

The hub member may comprises at least one dedicated or designated receiving zone for receiving the at least one spoke.

The at least one receiving zone may extends radially between the inner and outer rims, in similar and/or complementary guise with respect to the spoke(s) on the shroud component.

The at least one receiving zone may comprise at least one spoke-receiving recess. Each spoke-receiving recess may be shaped and sized to conform to the shape and size of a corresponding, complementary spoke.

There may be at least one brazed or welded joint, for example a brazing or welding spot, line or area, that permanently connects or secures the shroud and bladed disc components. For example, the spoke(s) can be joined to the hub member at the receiving zone(s).

The shroud component may be interference fitted to the bladed disc component. For example, a possibility is to press fit the hub structure or ring to the inner rim of the bladed disc component when the hub structure is the male element and the hub member is the female element. However, as mentioned above, the male-female relationship between the hub structure and the hub member can easily be reversed in different designs.

It is also possible to provide for interference fit between the spoke(s) and the corresponding receiving recess(es) on the hub member. This may be done as an alternative or in addition to the above welding and brazing.

Alternatively or additionally, the shoulder(s) or projection(s) may be press fitted to the outer rim of the hub member or to the corresponding shoulder receiving recess(es) provided on the hub member.

The relationship between the one or more blades disposed on the outer rim of the bladed disc component and the shroud structure when the shroud component is assembled with the bladed disc component may be a clearance fit, or a transition or location fit. The prior art method of welding or brazing at the blade tip sections may thus be compatible with the present new design of turbine wheel.

It is envisaged that this design of turbine wheels will be particularly suited to axial turbine wheels, and more particularly to axial turbine wheels of the kind used in automotive waste heat recovery systems of the type, for example, that the applicant currently designs and/or produces. These wheels may typically have an outer diameter smaller than 20 cm, or smaller than 15 cm, or smaller than 10 cm, and be used to withstand operating fluid temperatures of around 200 to 300 degrees C., and pressures up to 35 Bar.

According to another aspect of the present disclosure, there is provided a waste heat recovery system comprising a shrouded turbine wheel as described herein. A turbine wheel according to the first aspect of the disclosure may form part of an axial power turbine or a microturbine.

According to another aspect of the present disclosure, there is provided a spoked shroud component for assembling with a complementary bladed disc component to form a shrouded turbine wheel, the spoked shroud component comprising a shroud structure, a hub structure and at least one spoke extending radially between the shroud structure and the hub structure.

Preferably, the at least one spoke comprises at least one blade-form element adjacent the shroud structure.

Preferably, the at least one spoke comprises a shoulder or projection for engaging the bladed disc component.

According to another aspect of the present disclosure, there is provided a bladed disc component for assembling with a complementary spoked shroud component to form a shrouded turbine wheel, the bladed disc component comprising a hub member defining an outer rim, one or more turbine blades disposed on the outer rim and at least one recess extending radially toward said outer rim for receiving at least one respective spoke of the shroud component.

According to another aspect of the present disclosure, there is provided a method of manufacturing a spoked shroud component as described herein as a monolithic piece and/or a bladed disc component as described herein as a monolithic piece, said method comprising any one or more of the following:
 investment casting;
 metal injection moulding;
 direct metal laser sintering; and
 3D printing.

Preferably, the shroud component is investment casted.

Preferably, the bladed disc component is metal injection moulded.

According to another aspect of the present disclosure, there is provided a method of assembling a shrouded turbine wheel, the method comprising:
 providing a spoked shroud component comprising a shroud structure, a hub structure and at least one spoke extending radially between the shroud structure and the hub structure;
 providing a bladed disc component comprising a hub member defining an outer rims, and one or more turbine blades disposed on the outer rim;
 wherein the shroud and bladed disc components are one received or receivable by the other.

Preferably, the shroud and bladed disc components comprise one or more pairs of mating surfaces as described herein.

Preferably, the method further comprises joining or connecting the shroud and bladed disc components as described herein.

The shroud and bladed disc components may comprise at least one spoke received in a spoke receiving zone defined on the hub member as described herein.

Said pair of mating surfaces may comprise an external surface of the hub structure and an inner surface of the hub member that defines an inner rim.

Alternatively or additionally, said mating surfaces may comprise an outer surface of at least one spoke or shoulder thereof, and a surface of one or more recesses formed on the bladed disc component for receiving the spoke(s).

Joining the shroud and bladed disc components may comprise press-fitting, welding, sintering and/or brazing as described herein.

According to the present disclosure, therefore, there is provided a non-monolithic shrouded turbine wheel that can be assembled from at least two parts, and very preferably from two and only two parts, each of which is comparatively simpler to design and manufacture than the entire turbine wheel. The shroud is supported by the one or more spokes, which means that it will be less likely subject to peeling off, for given usage conditions, since this brings away stress from the interface between the blades and the shroud of the turbine wheel.

Any features introduces above as part of an aspect of the disclosure may be combined with any other features introduces as part of another aspect of the disclosure, unless otherwise specified.

BRIEF DESCRIPTION OF THE DRAWINGS

The present disclosure will now be described purely by way of example with reference to the accompanying Drawings in which.

DESCRIPTION

A turbine wheel is formed by coupling a shroud component 10 to a bladed disc component 20. The shroud component 10 can be mounted on the bladed disc component 20 or the bladed disc component 20 can be mounted on the shroud component 10. The shroud component 10 and the bladed disc component 20 as assembled form the turbine wheel 100.

Figure 1:
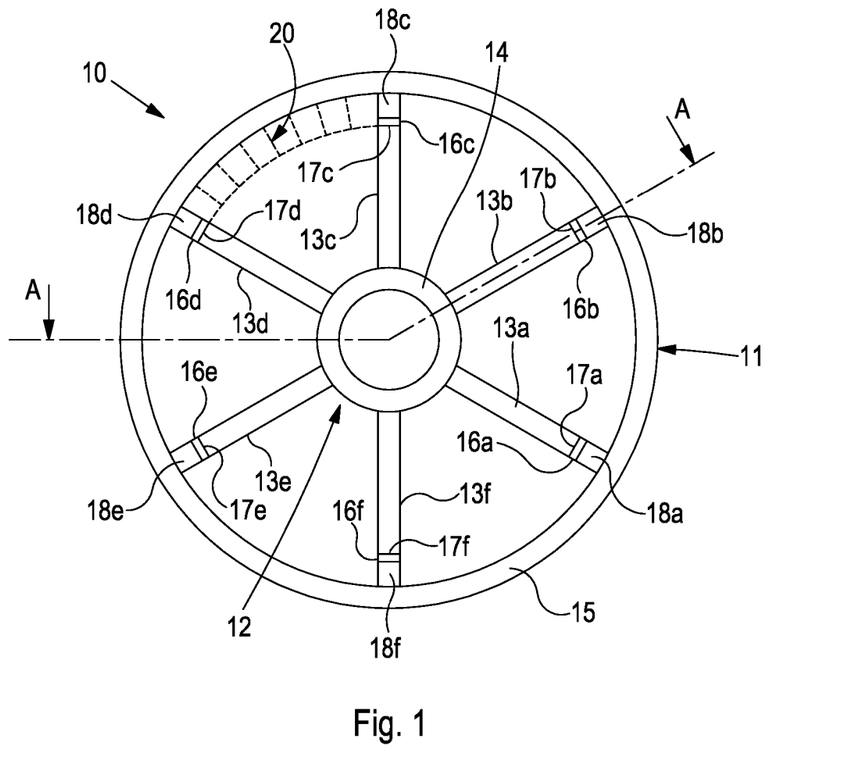
FIG. 1 is a plan view of a spoked shroud component as described herein.
Figure 2:
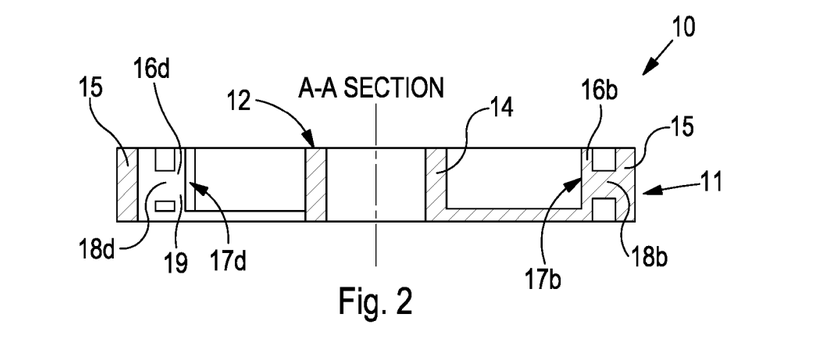
FIG. 2 is a cross-section of FIG. 1 along line A-A.

As shown in FIGS. 1-2, the shroud component 10 comprises a shroud structure 11, a hub structure 12 and at least one spoke 13a, 13b, 13c, 13d, 13e, 13f extending radially between the shroud structure 11 and the hub structure 12 as shown in FIGS. 1 and 2.

Figure 3:
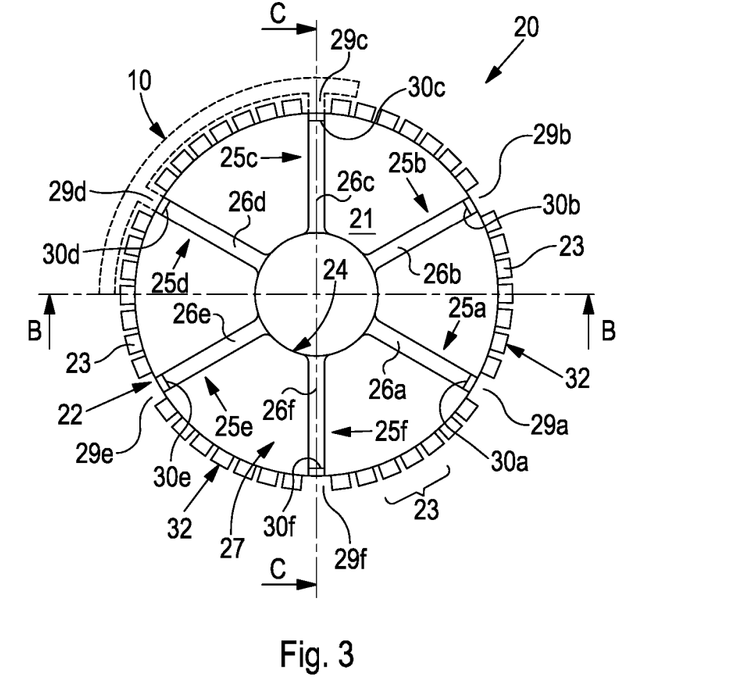
FIG. 3 is a plan view of a bladed disc component as described herein, complementary to the spoked shroud component shown in FIG. 1.
Figure 4:
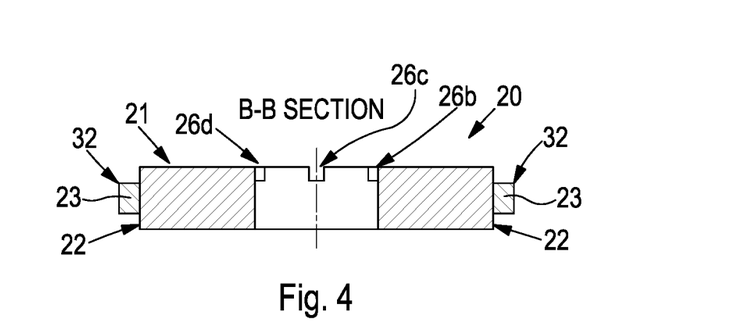
FIG. 4 is a cross section along line B-B of FIG. 3.
Figure 5:
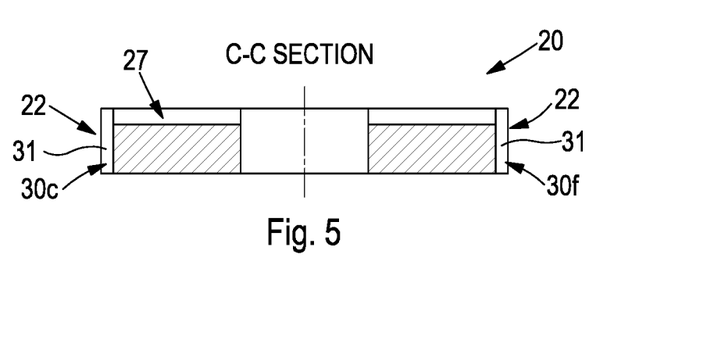
FIG. 5 is a cross section along line C-C of FIG. 3.

As shown in FIGS. 3-5, the bladed disc component 20 comprises a hub member 21. The hub member 21 defines an outer rim 22. In the illustrated bladed disc component 20, a plurality of turbine blades 23 are disposed on the outer rim 22 as shown in FIGS. 3-5.

The shroud structure 11 provides at least a shrouded portion 111 of the final or complete turbine wheel 100. In the described arrangement, however, the shroud structure 11 provides the entire shroud 111 of the shrouded turbine wheel 100.

In the illustrations, the turbine wheel 100 is assembled from only two parts 10, 20. However, it would be possible, for example, to provide the bladed disc component 10 as a single part, in much the same manner as described herein, and multiple shroud components 20 also generally of the type described herein, but modular so as to form the complete shroud 111 around the turbine wheel 100 using two or more similar shroud components.

Similarly, it would be possible to provide the shroud component 20 as a single part as described herein, and mount multiple modular bladed disc components 10 generally of the kind described herein on the shroud component 20. These modular arrangements are less preferred and are thus not described in detail herein.

The hub member 21 defines an inner rim 24 adapted to receive the hub structure 12. In the described arrangement, the hub structure 12 in the form of a hub ring 14. The inner rim 24 is circumferential and adapted to mate with the hub ring 14 for receiving, locating or connecting the shroud component 10 on the bladed disc component 20.

As used herein, "to receive" and its related terminology means at least a relation of close proximity between for example two "received" parts.

"To mate" and its related terminology means at least a relation of contact between for example two "mating" parts.

"To join" or "to connect" and their related terminology means instead a relation that involves exchange and/or transmission of forces between two parts, so that the parts are "joined" or "connected".

The shroud and bladed disc components 10, 20 described herein, therefore, are one received or receivable by the other, involve mating surfaces when one is received by the other and may be joined or connected to some more or less permanent degree so as to form the complete turbine wheel 100.

In the described arrangement, the shroud structure 11 is in the form of a shroud ring 15 angularly disposed around the entire hub structure 12 of the shroud component 10. Accordingly, the shroud component 10 is able to provide the entire shroud 111 of the turbine wheel 100.

Another characteristic of the described parts 10, 20 is that they are 'monolithic'. This means that each part is formed as a solid volume of material, for example by a casting or moulding process such as investment casting or metal injection moulding. Alternatives are possible, however, such as 3D printing or metal sintering. It will be observed that these parts 10, 20 are considerably less difficult to manufacture as single pieces than the entire turbine wheel 100 as a single piece.

In the described arrangement, each spoke comprises a shoulder or projection 16a, 16b, 16c, 16d, 16e, 16f for engaging with the hub member 21. In particular, each shoulder 16a-f comprises a corresponding axially extending wall 17a, 17b, 17c, 17d, 17e, 17f that mates with the outer rim 22 of the hub member 21. This zone is considered to be suitable for joining the parts 10, 20 by welding and/or brazing as explained in more detail below.

In the described arrangement, each spoke 13a-f also comprises a respective blade-form element 18a, 18b, 18c, 16d, 18e, 18f located adjacent the shroud structure 11.

The blade-form elements 18a-f, which are aerodynamic elements much like the turbine blades 23, depend from the shroud ring 15 radially inwardly and are disposed at regular angular intervals of 60 degrees in the described turbine wheel. Different angular configurations of the spokes 13a-f, and therefore the blade-form elements 18a-f, would however be possible.

Further, in the arrangement shown in FIGS. 1 and 2 each spoke 13a-f has one and only one respective blade-form element 18a-f. In alternative arrangements, however, there could be more than one blade-form elements associated to the same spoke. For example, each spoke could be angularly wider than shown in the accompanying Figures and encompass two blade-form elements. These arrangements, however, are less preferred and are therefore not described herein in detail.

Returning to the illustrations of FIGS. 1-5, six blade-form elements 18a-f extend radially from the respective shoulders or projections 16a-f to the shroud ring 15 at equal angular intervals of 60 degrees. The blade-form elements 18a-f are in this design integral with the spokes 13a-f and complement the number of blades 23 provided on the outer rim 22 of the bladed disc component 20.

Turning now to the bladed disc component 20 represented in FIGS. 3-5, the hub member 21 comprises six receiving zone 25a, 25b, 25c, 25d, 25e, 25f for receiving the six spokes 13a-f of the shroud component 10.

In the described arrangement, the receiving zones 25a-f extend to comprise respective spaces 29a, 29b, 29c, 29d, 29e, 29f identifiable on the outer rim 22 of the hub member 21 for receiving the blade-form elements 18a-f of each spoke 13a-f.

Portions 26a, 26b, 26c, 26d, 26e, 26 of the receiving zones 25a-f are identifiable on a radial wall 27 of the hub member 21 and extend radially between the inner and outer rims 22, 24.

Each receiving zone 25a-f comprises at least one axially extending recess 30a, 30b, 30c, 30d, 30e, 30f formed axially on the hub member 21 whose cross-section section is visible on the radial wall 27 of the hub member 21 as shown in FIGS. 3-5.

The radial recesses 26a-f on the radial wall 27 of the hub member 21 essentially conform to portions of the spokes 13a-f so that the spokes 13a-f are received therein. This spatial relationship between the spokes 13a-f and the corresponding portions 26a-f of the receiving zones 25a-f, when the first part 10 is coupled to the second part 20 to form the turbine wheel 100, is in this arrangement a transient or location fit. Press or interference fit would however also be possible. Where registration in place of the shroud component 10 on the bladed disc component 20 is performed elsewhere, then a clearance fit could alternatively be specified.

The turbine wheel 100 may be provided as a kit of disassembled parts 10, 20. The one or more shroud components 10 and the one or more bladed disc components 20 can subsequently be assembled to form a complete axial turbine wheel 100 in readiness for mounting as part of a system such as a waste heat recovery system (not shown) for automotive applications.

In the described turbine wheel 100, respective weld lines 33 connect each spoke 13a-f with the corresponding portions 26a-f of the hub receiving zone 25a-f, thereby creating or reinforcing the connection between the shroud and bladed disc components 10, 20.

In the described turbine wheel 100, the shroud component 10 is also press-fitted to the bladed disc component 20 via the hub structure 12 and corresponding inner rim 24 and opening on the hub member 21. This also creates a permanent connection between the shroud and bladed disc components 10, 20.

Further, each shoulder or projection 16 is press fitted to a corresponding shoulder receiving recess 30 provided on the hub member 21. In particular, in the described turbine wheel 100 each shoulder or projection 16 defines two opposed radially extending walls 19 which are press fitted to two corresponding opposed radially extending walls 31 of the hub member 21.

While in the present description the complete turbine wheel 100 is an axial turbine wheel, it will be appreciated that the present design can be applied in principle to any shrouded turbine wheel. The shown turbine wheel 100 has an outer diameter of 10 cm, but a range of different outer diameters are possible. The described design of turbine wheel is, however particularly suitable to small turbine wheels, having an outer diameter of 20 cm or less, or 10 cm or less.

The described shroud component 10 is made of a steel alloy and is manufactured by a casting technique, namely investment casting, as a monolithic piece. Other techniques are however possible such as metal injection moulding, direct laser sintering and/or 3D printing.

The described bladed disc component 20, is made of the same steel alloy as the shroud component 10, but is obtained via a metal injection moulding process, also as a monolithic piece. Other techniques are however possible just like for the shroud component 10, and encompass at least investment casting, direct metal laser sintering and 3D printing.

Investment casting is preferred for the shroud component 10 and metal injection moulding is preferred for the bladed disc component 20.

Figure 6:
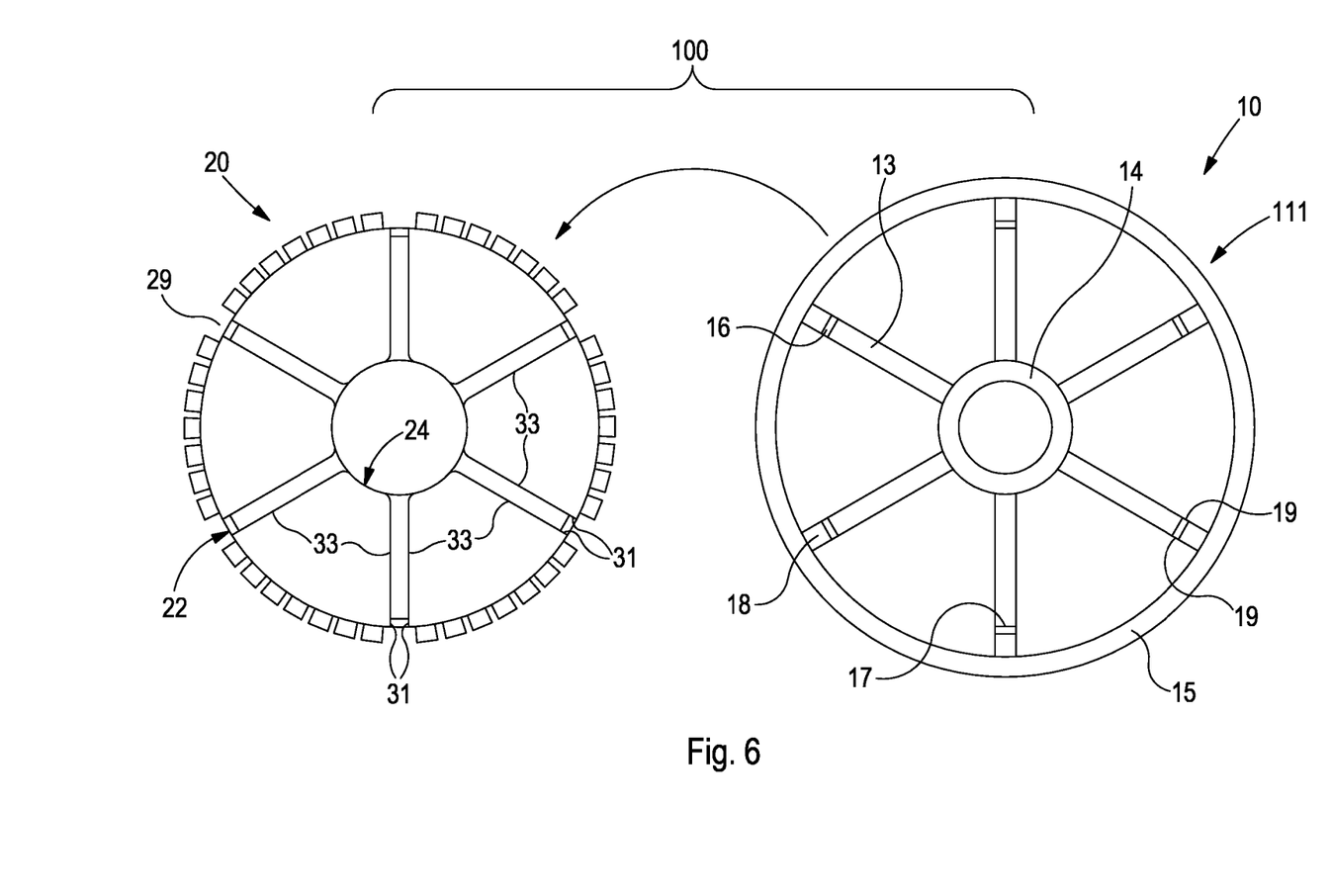
FIG. 6 explains schematically a method of assembling the complementary shroud and bladed disc components of FIGS. 1-5.

Referring now to FIG. 6, a method of mounting the shroud component 10 described herein onto the bladed disc component 20 described herein is schematically illustrated. The coupling of the shroud component 10 to the bladed disc component 20 is only schematically referred to by the arrow of FIG. 6.

The components 10, 20 are first laid out on the plane defined by the sheet of paper in the same orientations shown in FIGS. 1 and 3. The shroud component 10 is then mounted to, i.e. brought into mating engagement with, the bladed disc component 20, (which is instead kept still) as if the sheet of paper was folded in half, so that the right-hand half thereof folds over the left-hand half.

It would also be possible, conversely, to fit the bladed disc component 20 onto the shroud component (while this is kept still) or move both parts 10, 20 so as to couple them.

As the shroud component 10 is brought into mating engagement with the bladed disc component 20:
the hub structure 12 is received into the opening defined by the inner rim 24 of the hub member 21 and a connection is made by interference;
the spokes 13 are received into the corresponding spoke-receiving recesses 26 formed on the hub member 21, and this coupling is by transition fit;
the shoulders or projections 16 of the shroud component 10 are received into the respective shoulder receiving recesses 30 formed in the hub member 21 and couple therewith. The opposed radially extending walls 19 of the projections or shoulders couple by interference with the corresponding radial walls 31 of the recesses 30;
the blade-form elements 18 are received with clearance into the corresponding blade-form element receiving spaces 29 defined on the outer rim 22 of the hub member 21;
the axially extending surfaces 17 of the shoulder or projections 16 mate (i.e. a transition fit is specified here) with the corresponding axially extending surfaces on the hub recesses 30; and, importantly,
the shroud ring 15 is also received and precisely locates, although with some clearance, over the tips 32 of the blades 23 of the bladed disc component 20.

The shroud component 10 and the bladed disc component 20 are then permanently joined by applying weld or braze lines, as the case may be, along opposed radial lines 33 at the interface between the spokes 13a-f and the corresponding spoke-receiving recesses 26a-f.

Additionally, welding or brazing can be performed at or around the interface between the axially extending surfaces 17a-f and hub recesses 30a-f.

The described technique is also compatible with brazing and/or welding at the blade tip sections on or around the interface between the blades and the shroud, as done in the prior art.

As a further alternative, the shroud component 10 and the bladed disc component 20 may be formed as un-sintered (or 'green') parts. These green parts can then be mated and subsequently fused together during a sintering process.

The disclosure has been described above purely by way of example. It is intended, however, that different turbine wheels and related parts than those described herein be covered, within the scope of the appended claims.

What is claimed is:

1. A shrouded turbine wheel comprising:
a shroud component; and
a bladed disc component; wherein:
the shroud and bladed disc components are one received or receivable by the other such that, when one is received by the other, the shroud and bladed disc components co-rotate when the turbine wheel rotates,
the shroud, component comprises a shroud structure, a hub structure and at least one spoke extending radially between the shroud structure and the hub structure,
the bladed disc component comprises a hub member defining an outer rim, and one or more turbine blades disposed on the outer rim, and
the shroud structure provides at least a shrouded portion of the turbine wheel.

2. The turbine wheel of claim 1, wherein the turbine wheel consists of said shroud and bladed disc components.

3. The turbine wheel of claim 1, wherein the hub member defines an inner rim adapted to receive the hub structure.

4. The turbine wheel of claim 1, wherein the shroud structure comprises a shroud ring angularly disposed around at least part of the bladed disc component.

5. The turbine wheel of claim 1, wherein the shroud component and/or the bladed disc component is monolithic.

6. The turbine wheel of claim 1,
wherein the at least one spoke comprises a respective shoulder for engaging with a surface of the hub member.

7. The turbine wheel of claim 1, wherein the hub member comprises at least one receiving zone for receiving the at least one spoke.

8. The turbine wheel of claim 7, further comprising at least one joint or connection that connects the spoke to the receiving zone, thereby connecting the bladed disc and shroud components.

9. The turbine wheel of claim 1, wherein the shroud component is press-fitted to the bladed disc component.

10. The turbine wheel of claim 1, wherein the turbine wheel is an axial turbine wheel.

11. The turbine wheel of claim 10, wherein the turbine wheel has an outer diameter smaller than 20 cm.

12. The turbine wheel of claim 1, wherein at least one spoke comprises at least one blade-form element located adjacent the shroud structure.

13. The turbine wheel of claim 12, wherein the at least one blade-form element extends radially between a shoulder of the at least one spoke and the shroud structure.

14. A method of assembling a shrouded turbine wheel, the method comprising:

providing a shroud component comprising a shroud structure, a hub structure and at least one spoke extending radially between the shroud structure and the hub structure;

providing a bladed disc component comprising a hub member defining inner and outer rims, and one or more turbine blades disposed on the outer rim;

wherein the shroud and bladed disc components are one received or receivable by the other such that, when one is received by the other, the shroud and bladed disc components co-rotate when the turbine wheel rotates.

15. The method of claim 14, further comprising mating the shroud and bladed disc components.

16. The method of claim 15, wherein mating the shroud and bladed disc components comprises mating the at least one spoke and a receiving zone defined on the hub member.

17. The method of claim 15, wherein mating the shroud and bladed disc components comprises mating the hub structure and the hub member, or vice versa.

18. The method of claim 16, further comprising joining the shroud and bladed disc components.

19. The method of claim 18, wherein joining the shroud and bladed disc components comprises press-fitting; welding: sintering and/or brazing.

* * * * *